(12) United States Patent
Wong

(10) Patent No.: US 6,344,825 B1
(45) Date of Patent: Feb. 5, 2002

(54) ANTENNA APPARATUS FOR PORTABLE ELECTRONIC DEVICE

(75) Inventor: Wu-Shun Wong, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/652,152

(22) Filed: Aug. 31, 2000

(51) Int. Cl.⁷ .............................................. H01Q 1/24
(52) U.S. Cl. ...................................... 343/702; 343/720
(58) Field of Search ................................ 343/702, 720; 455/90; 361/680, 681; H01Q 1/24

(56) References Cited

U.S. PATENT DOCUMENTS

| | | | |
|---|---|---|---|
| 4,121,218 A | 10/1978 | Irwin et al. ................. | 343/702 |
| 4,868,576 A | 9/1989 | Johnson, Jr. ................. | 343/702 |
| 5,684,587 A * | 11/1997 | Karidis et al. .............. | 343/702 |
| 5,867,131 A | 2/1999 | Camp, Jr. et al. ............ | 343/797 |
| 5,936,587 A * | 8/1999 | Gudilev et al. ............. | 343/702 |
| 5,949,379 A | 9/1999 | Yang ........................... | 343/702 |
| 5,995,052 A * | 11/1999 | Sadler et al. ................ | 343/702 |

* cited by examiner

*Primary Examiner*—Michael C. Wimer
(74) *Attorney, Agent, or Firm*—Birch, Stewart, Kolasch & Birch, LLP

(57) ABSTRACT

An antenna apparatus built in a cover of an electronic device, such as portable data processors, to serve as a latch of the cover in addition to be an antenna for transmitting and receiving wireless communication signals. An antenna unit is embedded in a movable receptacle mounted on the cover so as be rotated to the highest position for a better communication performance when the cover is turned to a using position.

8 Claims, 4 Drawing Sheets

ANTENNA APPARATUS FOR PORTABLE ELECTRONIC DEVICE

BACKGROUND OF THE INVENTION

1. Field of Invention

The present invention generally relates to an antenna apparatus applicable to a portable electronic data processor, such as a notebook computer or a personal digital assistant (PDA), and more particularly relates to an antenna apparatus applicable to a portable electronic data processor, in which the antenna is built in a cover of the electronic device to serve as a latch of the cover in addition to an antenna for transmitting and receiving signals.

2. Related Art

As wireless communication techniques are fast developing, conventional wire transmissions are gradually replaced by wireless transmissions. Many portable electronic data processors, such as notebook computers or a personal digital assistants (PDA), are now using wireless communication methods to transmit and receive signals. The recent Bluetooth and wireless-LAN will further accelerate the applications of wireless communication for more and more products.

A portable electronic data processor using wireless communication at least includes an antenna for transmitting and receiving wireless signals; and a signal processing unit for processing the communication signals. The construction of the antenna can be at least classified into four kinds: antennas on PCMCIA cards; detachable outward antennas; retractable antennas mounted on the electronic data processors; and antennas built in the electronic data processors.

As disclosed in U.S. Pat. No. 5,949,379, a microwave antenna device incorporated on a PCMCIA network card for notebook computers includes an extended base with pivot acceptor connected to input port of a PCMCIA network card; a T-shaped pivot supported by pivot acceptor and capable of 180-degree rotation; a plate hooked up on the pivot and capable of 90-degree rotation in both clockwise and counter-clockwise direction; and a plate or bar microwave antenna capped on the pivot and connected through high frequency transmitting wire. In accordance with the above construction, the antenna is foldable when the network card has been removed from the slot of computer; and can be setup and adjusted to a better receiving angle after mounting the network card. However, the setup and adjustment are rather inconvenient and easy to damage the antenna.

U.S. Pat. Nos. 4,121,218 and 4,868,576 disclose extendible antennas for portable radios or portable cellular telephones. The antennas can be extended outwards when being used. But the operations are still bothersome and may influence the configuration of the electronic devices.

U.S. Pat. No. 5,867,131 discloses a mobile computer equipped with a sliding mechanism for securing an antenna within a recess in a stowed away position and in a fully deployed position. The antenna is located on back of a display portion of the computer. A securing mechanism is used to secure the antenna in the fully deployed position as well as in the stowed away position. The securing mechanism located outside will occupy a certain space when the computer is stored. It will influence the configuration of the computer. The antenna is also easy to be broken or damaged.

Another approach to equipped an antenna to a personal data processor is to have the antenna built in the case of the device. But, due to the EMI (electromagnetic interface) consideration, the case of a notebook computer, for example, is usually made of metallic material, such as Magnesium alloy, which well prevents any electromagnetic radiation from going outside or penetrating into the case of the computer, but will also obstruct the signal transmission and reception for the built-in antenna.

SUMMARY OF THE INVENTION

It is therefore an object of the present invention to provide an antenna apparatus for an electronic device in which the antenna apparatus is built in a cover of the electronic device to serve as a latch of the cover in addition to an antenna for transmitting and receiving signals.

An antenna apparatus applicable to a personal data processor, such as a notebook computer, according to the present invention is mounted on a cover of the computer. The cover is a movable unit of the computer which can be equipped with a display so as to be adjusted to a suitable angle for better viewing and folded up for easy carrying. A latch embedded with a plate type antenna apparatus is movably mounted on the cover for locking the cover to the main body of the computer and protecting the computer. While the cover is moved up as the display is being used, the antenna apparatus is moved accordingly to a higher position to attain better transmission and reception of communication signals.

The aforesaid built-in antenna apparatus at the latch portion won't influence the configuration of the computer, and won't be obstructed of its signal transmission and reception by the design of EMI prevention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
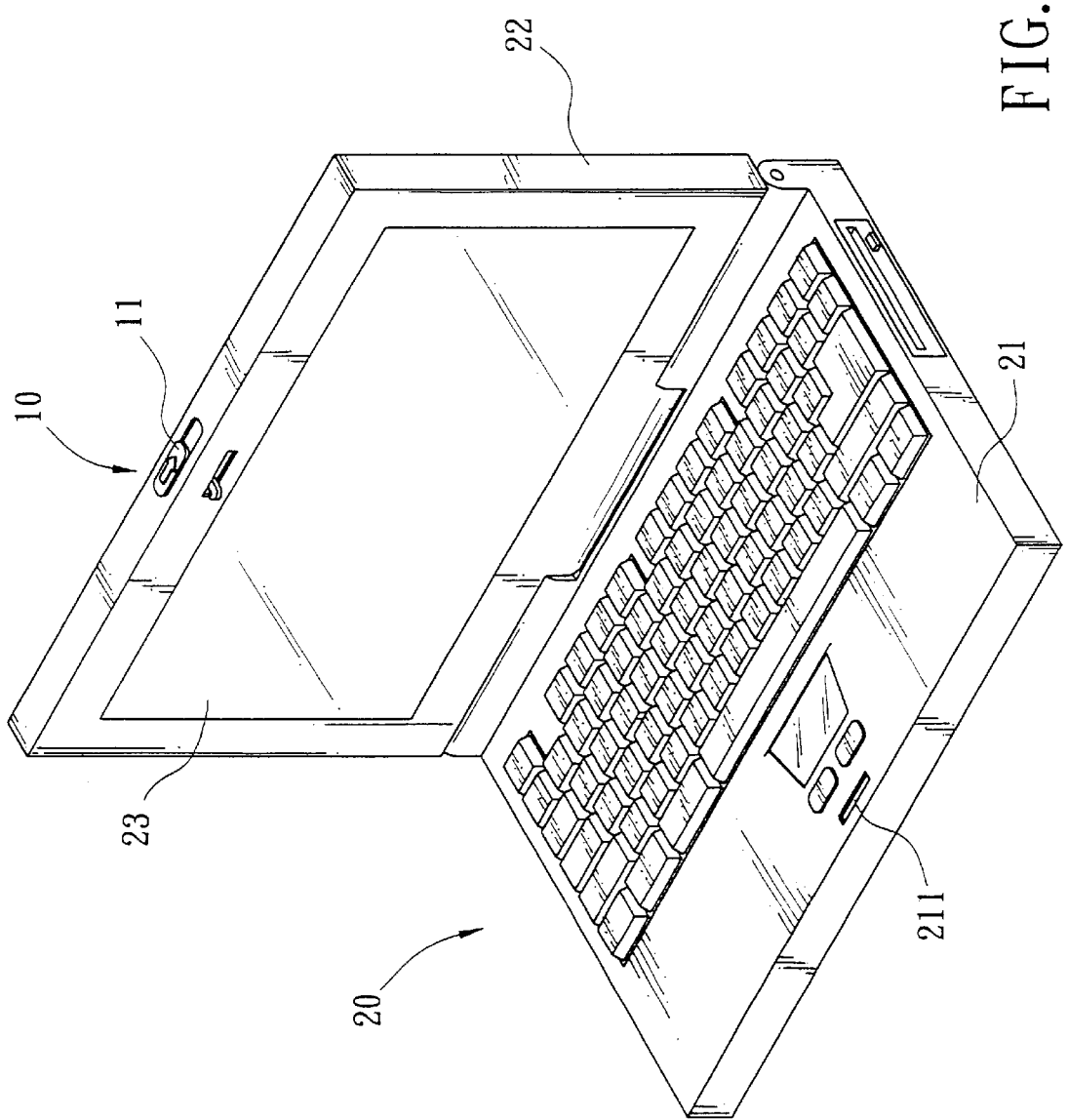
FIG. 1 is an embodiment of the present invention showing a notebook computer in a using state.
Figure 2:
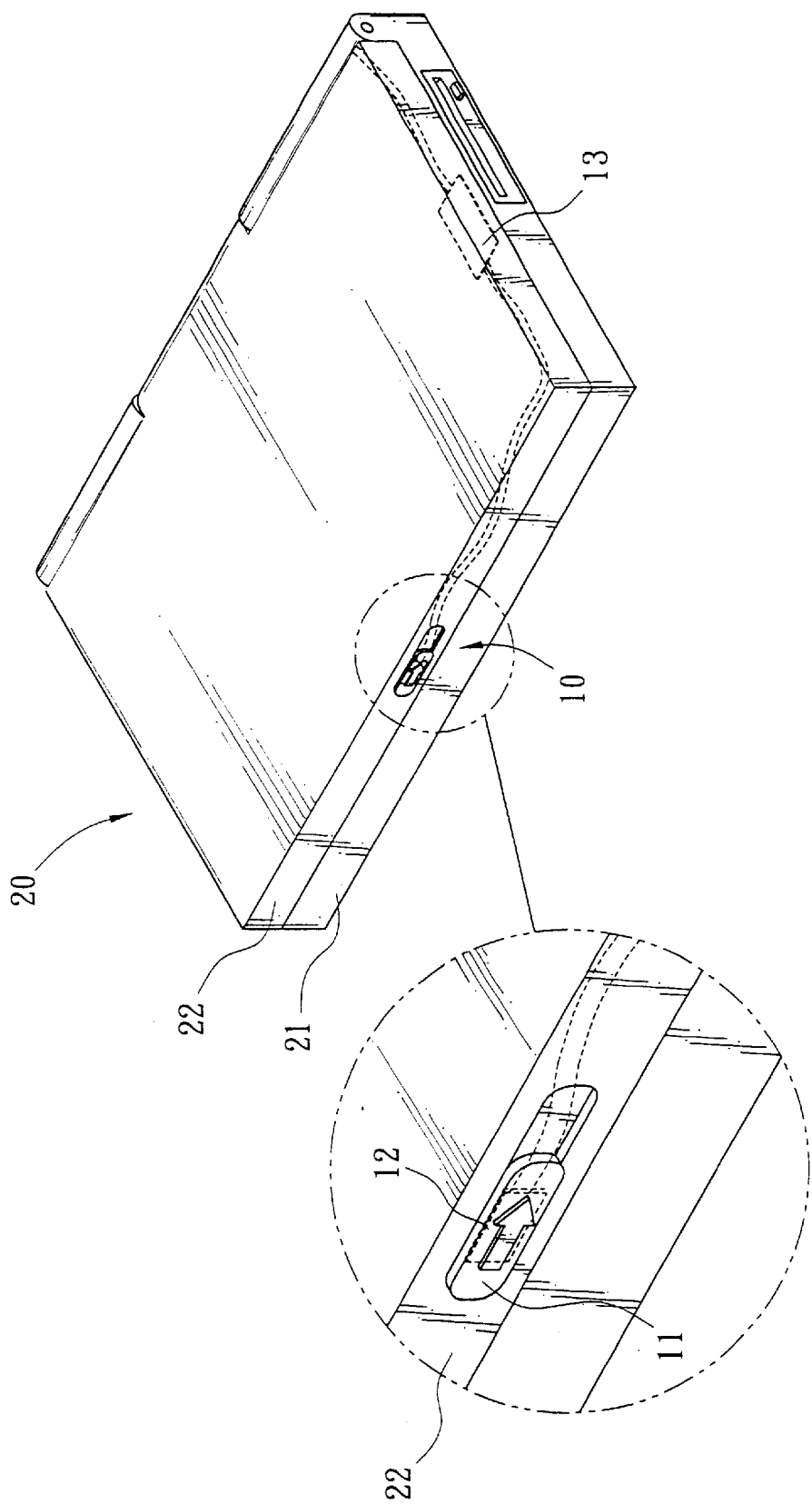
FIG. 2 is further an embodiment of the present invention showing a notebook computer in a closed state.

An antenna apparatus according to the present invention is applicable to a portable data processor, such as a notebook computer or a personal digital assistant. Taking a notebook computer as an example, as shown in FIGS. 1 and 2, the computer 20 includes a main body 21 and a cover 22. The main body 21 executes the data processing and displays information through a display 23 fixed on the cover 22. The cover 22 is pivotally mounted on the main body 21 so as to be folded down with the main body 21 to a closed position; and moved up to a viewing position for user to view the display 23.

Figure 3B:
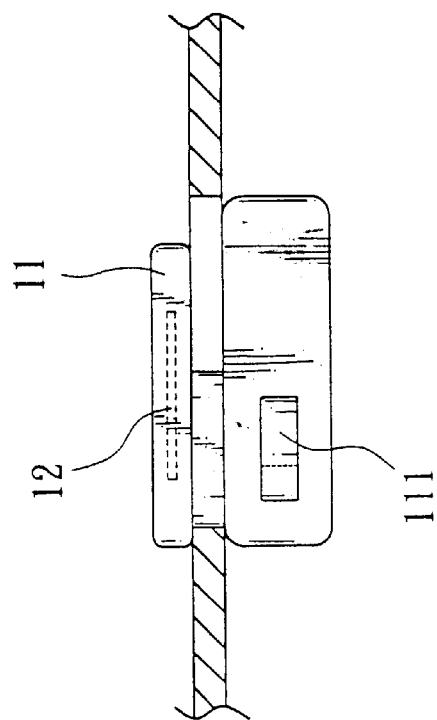
FIGS. 3A and 3B are constructional views of an antenna apparatus of the present invention.
Figure 3A:
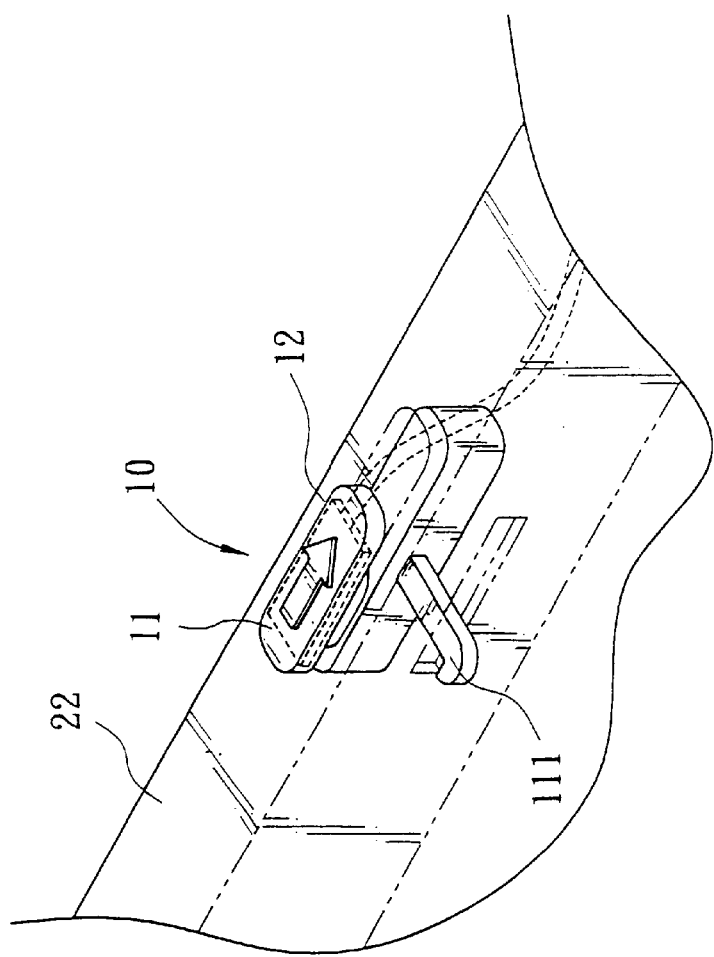

As shown in FIGS. 3a and 3B, the antenna apparatus 10 of the present invention includes a receptacle 11 arranged at one of the upper, the left and the right rim of the cover 22 (the upper rim as shown); and an antenna unit 12 embedded in the receptacle 11. The receptacle 11 is a latch movably mounted at a suitable position on upper rim of the cover 22. The latch is selectively movable between a normally locking position and a manually release position. A hook 11 is formed on the receptacle 1, while the main body 21 is formed with a latch hole 211 corresponding to the position of the hook 111 so as to lock the hook 111 when the cover 22 is folded up to the main body 21 as in the closed position where the display 23 and the main body 21 are protected. Then, when the computer 20 is to be used, the user unlatches the receptacle 11 to move the cover 22 and display 23 to the viewing position with a suitable angle for easy viewing the information shown on the display 23.

The antenna unit 12 is a plate type antenna embedded in the receptacle 11 for receiving and transmitting wireless signals in radio frequency band. The receptacle 11 is made of plastics so as to be free from obstructing the communication signals. Because the receptacle 11 is located on the upper rim of the cover 22, it will be turned to the highest position of the computer 20 when the cover and display 23 is rotated to the using position where the antenna apparatus 10 gets a best communication performance. Furthermore, since the receptacle 11 positions at the rim of the cover 22 and a little extrudes outward from the surface thereof to be easily operated by the user, it won't influence the EMI design of the cover 22 or the main body 21 of the computer 20, nor be influenced of its communication efficiency by the EMI design of the computer 20. Also, the receptacle 11 with antenna unit 12 is well designed to be a latch of the cover 22 without further extrusion or moving parts, so that it won't influence the configuration of the computer 20, and won't be damaged easily.

The antenna unit 12 is electrically connected via a signal processing interface 13 to the main body 21. The signal processing interface 13 is a radio frequency interface for processing the signals to be transmitted and the received signals. The signal processing interface 13 can be located in the main body 21, or in the cover 22 to free its space for the main body 21.

The antenna unit 12 embedded in the receptacle 11 forms an antenna apparatus 10. A hook 111 also formed on the receptacle 11 to make the antenna apparatus 10 not only an antenna for wireless communication but also a latch for the cover 22. The antenna apparatus 10 will be moved to the highest position of the computer 20 when the cover 22 with display 23 is rotated to the using position where the antenna apparatus 10 gets a best communication performance.

Figure 4:
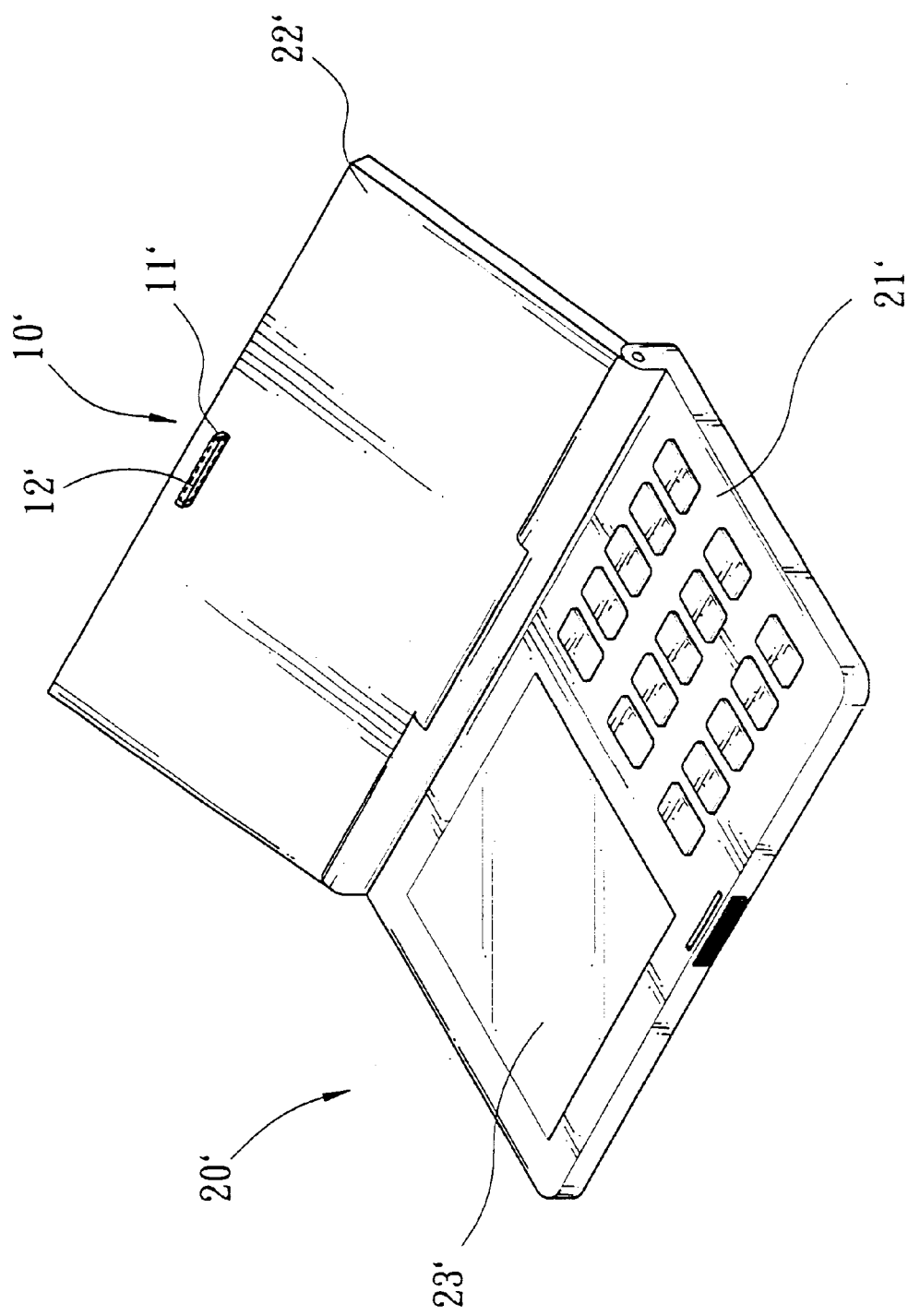
FIG. 4 is another embodiment of the present invention showing a personal digital assistant in a using state.

FIG. 4 shows another embodiment of the present invention applied to a personal digital assistant. The personal digital assistant 20' includes a main body 21' and a cover 22'. The main body 21' executes the data processing and displays information through a display 23' fixed on the cover 22'. The cover 22' is pivotally mounted on the main body 21' so as to be folded down with the main body 21' to a closed position; and moved up to a viewing position for user to view the display 23'. The antenna apparatus 10' includes a receptacle 11' arranged on upper rim of the cover 22'; and a antenna unit 12' embedded in the receptacle 11'. The receptacle 11' is a latch movably mounted at a suitable position on upper rim of the cover 22'. The latch is selectively movable between a normally locking position and manually release position. The antenna unit 12' embedded in the receptacle 11' and electrically to the main body 21' will be moved to the highest position of the PDA 20' when the cover 22' with display 23' is rotated to the using position where the antenna apparatus 10' gets a best communication performance.

In conclusion, an antenna apparatus according to the present invention gets the following advantages:

a) the antenna apparatus located at the upper rim of the cover will be moved to the highest position for a best communication performance when the cover is rotated to the using position;

b) the antenna apparatus positioned at the rim of the cover won't influence the EMI design of the personal data processor, nor be influenced of its communication efficiency by the EMI design of the personal data processor; and c) the structure of the antenna apparatus is simple, low-cost and can be easily made.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antenna apparatus applicable to an electronic device having a movable display, comprising:

a latch, arranged on one rim of the display, for movably locking and unlocking the display to and from the electronic device; and an antenna unit embedded in the latch, to be electrically connected to a signal processing interface of the electronic device, for transmitting and receiving wireless signals.

2. The antenna apparatus as recited in claim 1, wherein the antenna unit is a plate antenna in a radio frequency band.

3. The antenna apparatus as recited in claim 1, wherein the electronic device is a computer.

4. The antenna apparatus as recited in claim 1, wherein the electronic device is a personal digital assistant.

5. The antenna apparatus as recited in claim 1, further comprising a latch hole on the electronic device, the display being movable relative to the latch hole and the latch being received in the latch hole when the display is locked to the electronic device.

6. The antenna apparatus as recited in claim 1, wherein the display has a top, a bottom and two sides, the bottom of the display being connected to the electronic device and the latch being located on the top of the display.

7. The antenna apparatus as recited in claim 1, wherein the latch is longitudinally reciprocable along the one rim of the display.

8. The antenna apparatus as recited in claim 1, wherein the antenna is fixedly mounted in the latch.

* * * * *